United States Patent
Lee et al.

(10) Patent No.: US 11,449,219 B2
(45) Date of Patent: Sep. 20, 2022

(54) ELECTRONIC DEVICE INCLUDING DISPLAY DEVICE INCLUDING TOUCH SENSOR FOR CONTROLLING A CURSOR

(71) Applicant: SAMSUNG ELECTRONICS CO., LTD., Suwon-si (KR)

(72) Inventors: Seungyup Lee, Suwon-si (KR); Jinseok Kim, Suwon-si (KR); Minjeong Moon, Suwon-si (KR); Minjung Moon, Suwon-si (KR); Myojin Bang, Suwon-si (KR); Seoyoung Yoon, Suwon-si (KR); Dami Jeon, Suwon-si (KR); Jaegi Han, Suwon-si (KR); Jiyoon Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/857,692

(22) Filed: Apr. 24, 2020

(65) Prior Publication Data

US 2020/0341629 A1  Oct. 29, 2020

(30) Foreign Application Priority Data

Apr. 26, 2019 (KR) .................. 10-2019-0049246

(51) Int. Cl.
*G06F 3/04883* (2022.01)
*G06F 3/0481* (2022.01)

(52) U.S. Cl.
CPC ........ *G06F 3/04883* (2013.01); *G06F 3/0481* (2013.01)

(58) Field of Classification Search
CPC .. G06F 3/0416; G06F 3/0481; G06F 3/04842; G06F 3/04883; G06F 40/166; G06F 2203/04801; G06F 3/04812
See application file for complete search history.

(56) References Cited

U.S. PATENT DOCUMENTS

| 9,104,305 | B2 | 8/2015 | Bao et al. |
| 9,110,584 | B2 | 8/2015 | Bao et al. |
| 9,851,890 | B2 | 12/2017 | Kim et al. |
| 10,222,980 | B2 | 3/2019 | Alonso Ruiz et al. |

(Continued)

FOREIGN PATENT DOCUMENTS

| KR | 10-2008-0073389 | 8/2008 |
| KR | 10-2014-0060133 | 5/2014 |
| KR | 10-2018-0051674 | 5/2018 |

OTHER PUBLICATIONS

International Search Report dated Aug. 14, 2020 in corresponding International Application No. PCT/KR2020/005449.

*Primary Examiner* — Tan H Tran
(74) *Attorney, Agent, or Firm* — Nixon & Vanderhye P.C.

(57) ABSTRACT

Disclosed is an electronic device including a display device including a touch sensor and a processor electrically connected to the touch sensor and the display device, wherein the processor is configured to control the electronic device to: display content and a cursor on a first area of the display device, display a touch pad user interface configured to receive a touch input on a second area of the display device, and control the cursor on the first area based on the touch input received through the touch pad user interface displayed on the second area.

20 Claims, 16 Drawing Sheets

(56) References Cited

U.S. PATENT DOCUMENTS

| | | | |
|---|---|---|---|
| 2002/0130838 A1* | 9/2002 | Feierbach | G09G 5/08 345/157 |
| 2011/0320978 A1* | 12/2011 | Horodezky | G06F 3/0488 715/823 |
| 2012/0229493 A1* | 9/2012 | Kim | G06F 40/166 345/589 |
| 2014/0002393 A1 | 1/2014 | Bao et al. | |
| 2014/0002398 A1 | 1/2014 | Bao et al. | |
| 2014/0181722 A1 | 6/2014 | Kim et al. | |
| 2015/0193930 A1* | 7/2015 | Nakagawa | G06T 7/155 382/119 |
| 2016/0274686 A1 | 9/2016 | Alonso Ruiz et al. | |
| 2016/0274761 A1* | 9/2016 | Alonso Ruiz | G06F 3/0488 |
| 2017/0235483 A1 | 8/2017 | Alonso Ruiz et al. | |
| 2018/0011543 A1* | 1/2018 | Funami | G06F 9/453 |
| 2019/0155503 A1 | 5/2019 | Alonso Ruiz et al. | |
| 2020/0057555 A1* | 2/2020 | Walkin | G06F 3/04817 |
| 2020/0409551 A1* | 12/2020 | Marsden | G06F 3/016 |

\* cited by examiner $\Delta H_{max}$ :Max differential of height
$\Delta W_{max}$ :Max differential of width $D_{threshold1}: \Delta H_{max} = \Delta H : \Delta y (\Delta y = y_1 - y_0)$
$D_{threshold1}: \Delta W_{max} = \Delta W : \Delta y (\Delta x = x_1 - x_0)$

ELECTRONIC DEVICE INCLUDING DISPLAY DEVICE INCLUDING TOUCH SENSOR FOR CONTROLLING A CURSOR

CROSS-REFERENCE TO RELATED APPLICATION

This application is based on and claims priority under 35 U.S.C. § 119 to Korean Patent Application No. 10-2019-0049246, filed on Apr. 26, 2019, in the Korean Intellectual Property Office, the disclosure of which is incorporated by reference herein its entirety.

BACKGROUND

1. Field

The disclosure relates to an electronic device including a display device including a touch sensor. For example, various embodiments relate to an electronic device that provides a touch pad user interface (UI) for operation of a cursor.

2. Description of Related Art

In an electronic device based on a display device including a touch sensor, a user directly touches a display of the display device with a finger when a user wants to perform input. In the electronic device based on a display device including a touch sensor, one of the most troublesome parts when the user performs input is operation of a cursor on the display.

The way the user directly performs input to the display with a finger has the advantage of being intuitive, but there is a disadvantage in that fine operation is difficult due to visual interference, such as the user's finger hides content being displayed on the display when performing input. In particular, in the case of a task requiring editing through a fine adjustment such as a cursor in a document, this disadvantage becomes more prominent and may be a serious factor that hinders the user's document editing experience itself.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and provide at least the advantages described below. Accordingly, an example aspect of the disclosure provides an electronic device which eliminates and/or reduces visual interference in which a finger or an input device such as a touch pen hides a display and provides an improved method of operating a cursor with improved accuracy, thus providing various user experiences.

In accordance with an example embodiment of the disclosure, an electronic device includes: a display device including a touch sensor, a processor electrically connected to the touch sensor and the display device, wherein the processor is configured to control the electronic device to: display content and a cursor on a first area of the display device, display a touch pad user interface configured to receive a touch input on a second area of the display device, and control the cursor on the first area based on the touch input received through the touch pad user interface displayed on the second area.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

In the description of the drawings, the same or similar reference numerals may be used for the same or similar components.

DETAILED DESCRIPTION

Hereinafter, various example embodiments of the disclosure may be described with reference to accompanying drawings. Accordingly, those of ordinary skill in the art will recognize that modifications, equivalents, and/or alternatives on the various example embodiments described herein can be variously made without departing from the scope and spirit of the disclosure.

Hereinafter, components included in an electronic device according to an embodiment will be described with reference to FIGS. 1 and 2.

Figure 1:
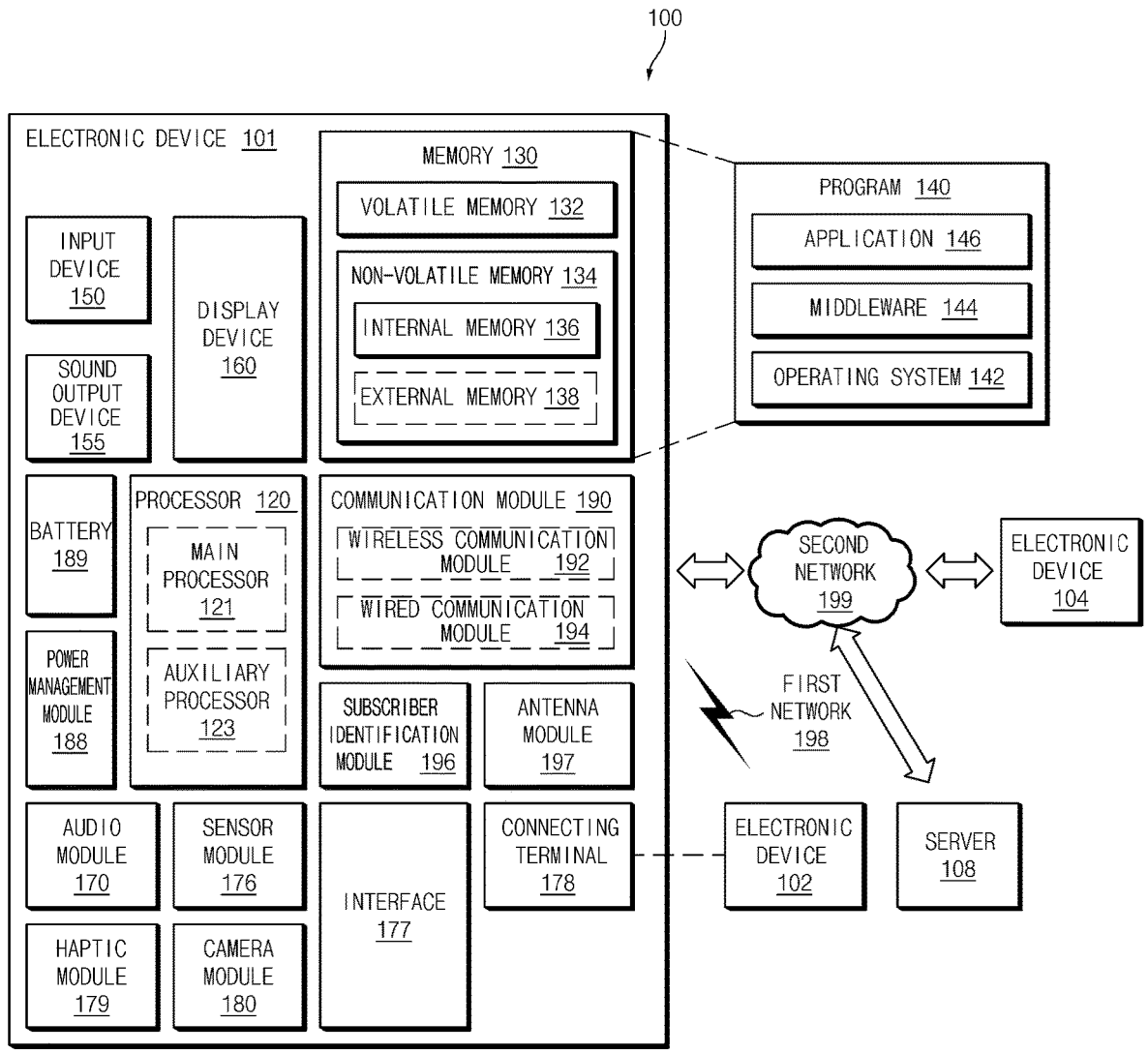
FIG. 1 is a block diagram illustrating an example electronic device in a network environment, according to various embodiments.

FIG. 1 is a block diagram illustrating an example electronic device in a network environment, according to various embodiments. FIG. 2 is a block diagram illustrating an example display device of the electronic device of FIG. 1.

devices to perform at least part of the function or the service. The one or more external electronic devices receiving the request may perform the at least part of the function or FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the camera module 180) of the components may be omitted from the electronic device 101, or one or more other components may be added in the electronic device 101. In some embodiments, some of the components may be implemented as single integrated circuitry. For example, at least part of the sensor module 176 (e.g., a pressure sensor, a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen). Also, the input device 150 may be a concept including a display device 160 including a touch sensor.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch. The display device 160 will be described in detail below with reference to FIG. 2.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and maynot include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
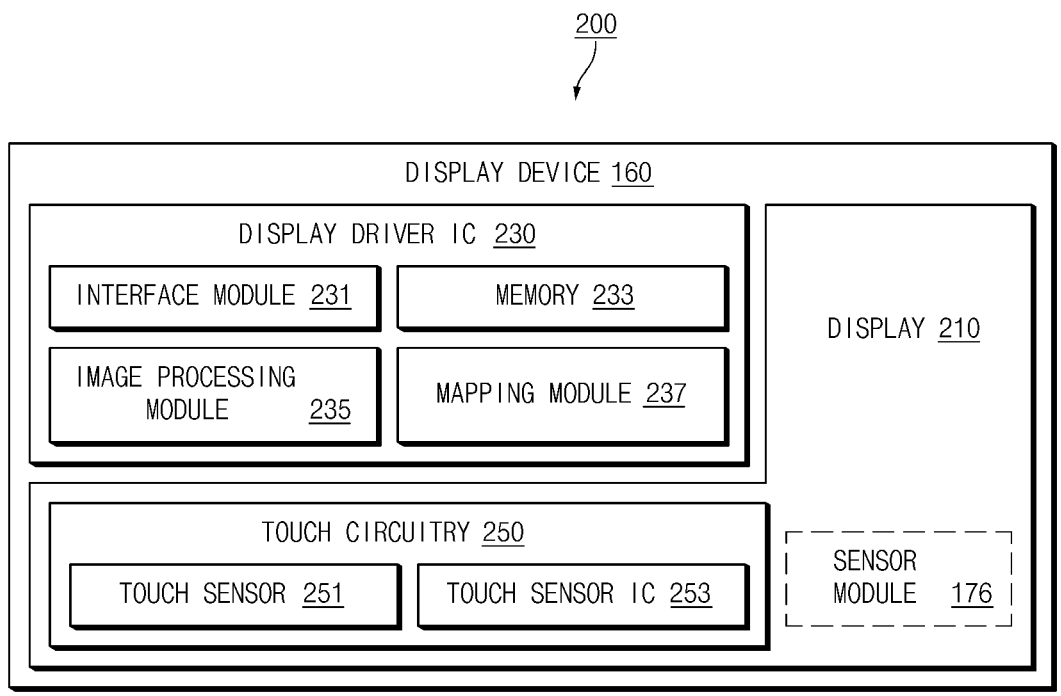
FIG. 2 is a block diagram illustrating an example display device of the electronic device of FIG. 1 according to various embodiments.

FIG. 2 is a block diagram 200 illustrating the display device 160 according to various embodiments. Referring to FIG. 1 and FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Hereinafter, a touch pad user interface (UI) mode of the electronic device according to an embodiment will be described in detail with reference to FIGS. 3 and 4. Hereinafter, operations illustrated in FIGS. 3 to 16 or described in embodiments described with reference to FIGS. 3 to 16 may be performed by the electronic device 101 of FIG. 1 or by the processor 120.

Figure 3:
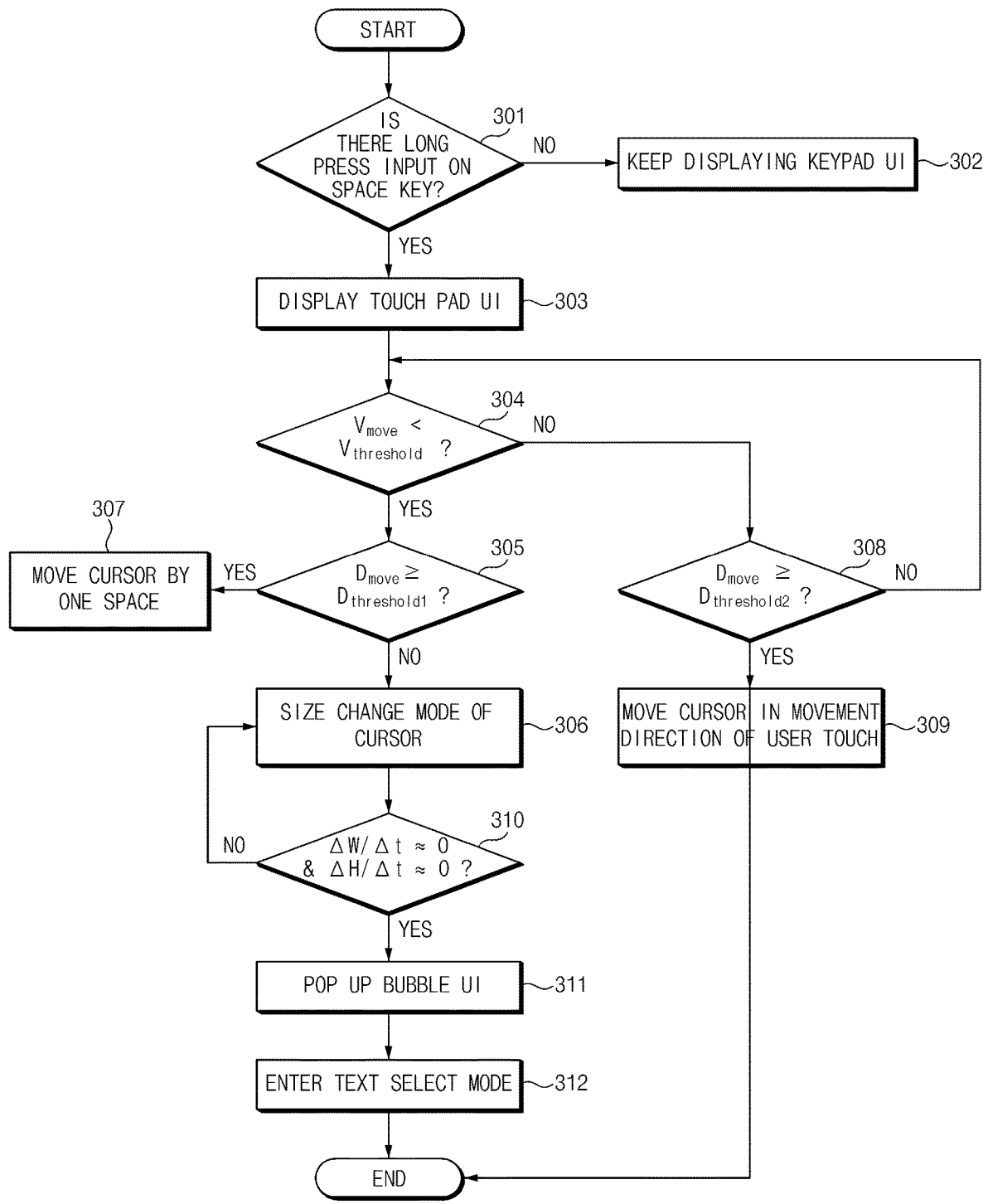
FIG. 3 is a flowchart illustrating an example method of operating a cursor in an electronic device according to an embodiment.

FIG. 3 is a flowchart illustrating an example method of operating a cursor in an electronic device according to an embodiment. FIG. 4 is a diagram illustrating an example display of a display device of an electronic device according to an embodiment.

Figure 4:
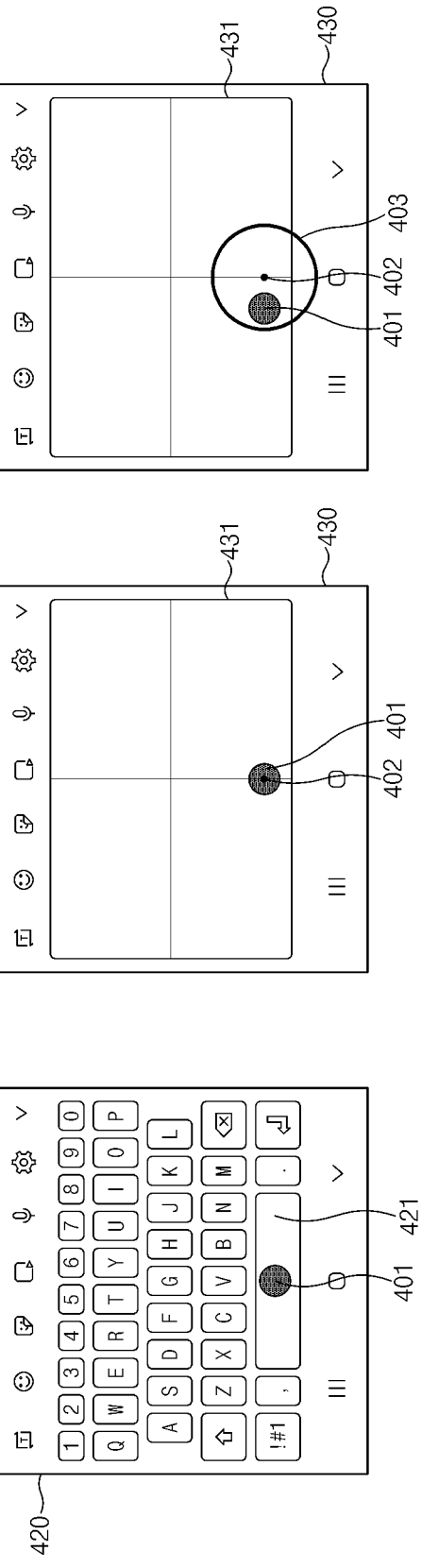
FIG. 4 is a diagram illustrating an example display of a display device of an electronic device according to an embodiment.

Referring to FIGS. 3 and 4, an electronic device according to an embodiment may determine whether there is a long press input on a space key 421 of a keyboard user interface UI 420 (301).

Referring to FIG. 4, the electronic device according to an embodiment may display the keyboard UI 420 through the display device when receiving a text input of a user. The processor may display the keyboard UI 420 on the display of the display device when receiving an input to start the keyboard UI 420 such as a touch on an area where a user is able to input text or a touch on a keyboard menu. The processor may display content 410 on the display of the electronic device, and the keyboard UI 420 may be displayed at a lower portion of the content 410.

The content 410 may collectively refer, for example, to an object including an area where a user is able to input text from among objects which the electronic device is capable of displaying. For example, the content 410 may be various, such as an editing mode for a document, video, or image, a messenger application or an Internet window including an address window, a search window, a comment window, and the like. In the present embodiment, a document including text is illustrated as an example of the content 410.

The processor may display a cursor 411 on the content 410 of the display. The cursor 411 may indicate a location where text is to be input on the content 410 in response to the input received from the keyboard UI 420. The user may operate to place the cursor 411 at a location where he or she wants to input text on the content 410.

The keyboard user interface (UI) 420 may include the space key 421. The processor may determine whether there is a long press input on the space key 421. The long press input may be an operation in which the user touches the space key 421 for a predetermined time. The predetermined time may, for example, be a time longer than a time required to touch the space key 421 to input a space. The current location 401 of the user's touch may be displayed on the display.

Referring back to FIGS. 3 and 4, when it is determined that there is no long press input on the space key 421, the processor may continuously display the existing keyboard UI 420 (302).

When it is determined that there is a long press input on the space key 421, the processor may display a touch pad user interface (UI) 430 on the display (303). Although the space key 421 is described as an example with reference to FIG. 3 and FIG. 4, according to an embodiment, the processor may display the touch pad UI 430 based on reception of a long press input on another key of the keyboard UI 420. In addition, although long press input is described as an example with reference to FIGS. 3 and 4, an input for entering the touch pad UI 430 mode is not limited thereto, and there are diverse inputs such as a drag, consecutive touches, rotation, a touch with two fingers, a flick, a rotation with two fingers, etc.

Referring to FIG. 4, when the long press input on the space key 421 of the keyboard UI 420 is received, the processor may display the touch pad UI 430 at a location of the keyboard UI 420. The touch pad UI 430 may include a rectangular touch input area 431 having an area corresponding to a key pad of the keyboard UI 420.

The processor may change a color of the cursor 411 in response to activation of the touch pad UI 430. As the color of the cursor 411 is changed, the user may recognize that the touch pad UI 430 is activated.

The processor may display a touch 401 of a current user on the touch pad UI 430. The reference coordinates 402 displayed on the touch pad UI 430 may indicate a location of the user's touch at a time point at which the touch pad UI 430 starts to be activated or a location at which the user starts touching after the touch pad UI 430 is displayed. The coordinates of the touch 401 of the current user and the reference coordinates 402 may be equal to each other.

After the touch pad UI 430 is activated, the processor may display a circular distance threshold area 403 centered on the reference coordinates 402 on the touch pad UI 430. The radius of the distance threshold area 403 may be a first distance threshold value (Dthreshold1).

The user's touch 401, the reference coordinates 402, and the distance threshold area 403 may be for providing a visual guide to the user and at least one of the user's touch 401, the reference coordinates 402, and the distance threshold area 403 may not be displayed.

When the user's touch 401 moves within the distance threshold area 403, the processor may enter a size change mode of the cursor 411. The processor may change a size of the cursor 411' in the size change mode in response to a user's touch.

Hereinafter, a size change mode of a cursor of an electronic device according to an embodiment will be described in greater detail below with reference to FIGS. 3, 5, and 6.

Figure 5:
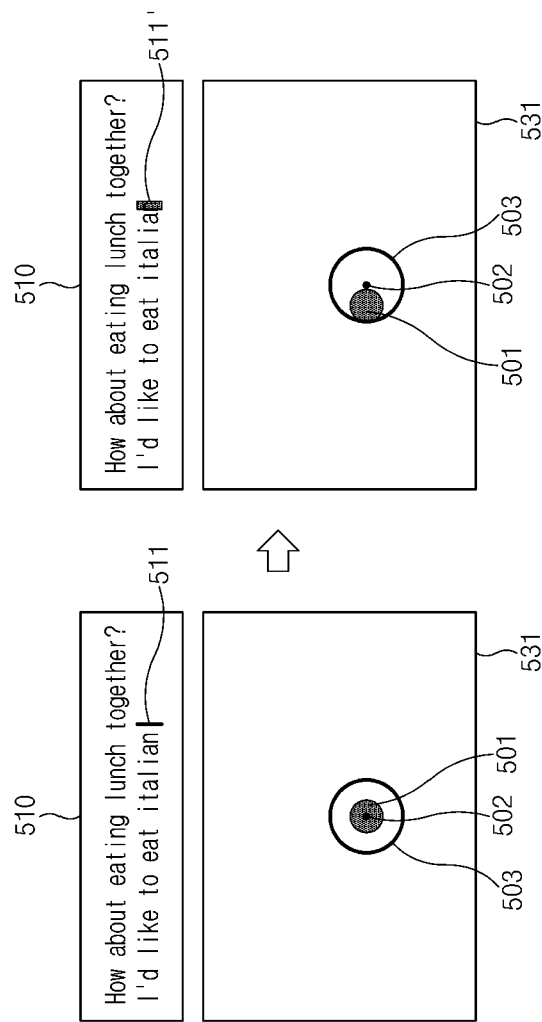
FIG. 5 is a diagram illustrating an example cursor size change mode of an electronic device according to an embodiment.

FIG. 5 is a diagram illustrating an example cursor size change mode of an electronic device according to an embodiment. FIG. 6 is a diagram illustrating an example cursor size change mode of an electronic device according to an embodiment.

Referring to FIGS. 3 and 5, the processor may determine whether a movement speed (Vmove) of a user's touch 501 on a touch input area 531 is less than a speed threshold value (Vthreshold) (304). In this example, the user's touch 501 may be continuous with a long press input for a space key of a keyboard UI for entering a touch pad UI mode, or may be a new input after release after the long press input is performed. However, determination process 304, determination process 305, determination process 308, and determination process 310 of FIG. 3, which will be described in greater detail below, may be sequentially performed on one continuous user's touch without release.

The processor may display reference coordinates 502 and a distance threshold area 503 centered on the reference coordinates 502 on the touch input area 531.

When it is determined that a movement speed (Vmove) of the user's touch 501 is less than the speed threshold value (Vthreshold), the processor may determine whether a movement distance (Dmove) of the user's touch 501 is greater than or equal to a first distance threshold value (Dthreshold1) (305). For example, the processor may determine whether the user's touch 501 escapes from the distance threshold area 503.

When the movement distance (Dmove) of the user's touch 501 is less than the first distance threshold value (Dthreshold1), for example, when the user's touch 501 has moved within the distance threshold area 503, the processor may enter to the size change mode of a cursor 511 (306).

Referring to FIG. 5, when the user's touch 501 has moved to the left side with respect to the reference coordinates 502 within the distance threshold area 503 at a speed less than the speed threshold value (Vthreshold), the processor may enter a size change mode of the cursor 511 and the processor may increase a width of a cursor 511' in the size change mode to the left side, which is the movement direction of the user's touch 501. In this example, the processor may change the width of the cursor 511' in the size change mode to be proportional to the movement distance of the user's touch 501.

Figure 6:
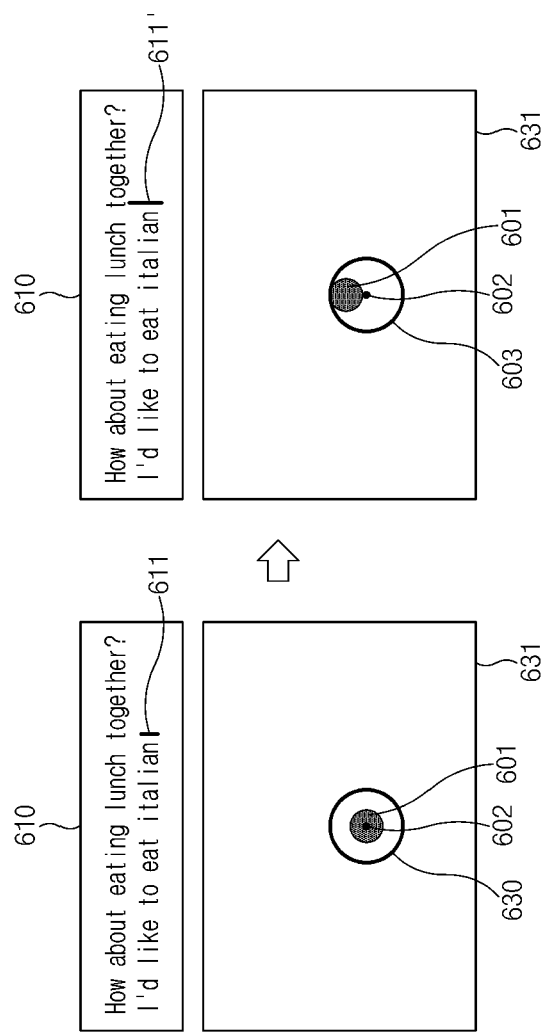
FIG. 6 is a diagram illustrating an example cursor size change mode of an electronic device according to an embodiment.

Referring to FIG. 6, when a user's touch 601 has moved to the upper side with respect to reference coordinates 602 within the distance threshold area 603 at a speed less than the speed threshold value (Vthreshold) on a touch input area 631, the processor may enter a size change mode a the cursor 611 and increase a height of a cursor 611' in the size change mode to the upper side, which is the movement direction of the user's touch 601. In this example, the processor may change the height of the cursor 611' in the size change mode to be proportional to the movement distance of the user's touch 601

Hereinafter, an example method of determining a size of a cursor in a size change mode of an electronic device according to an embodiment will be described in greater detail with reference to FIGS. 7 and 8.

Figure 7:
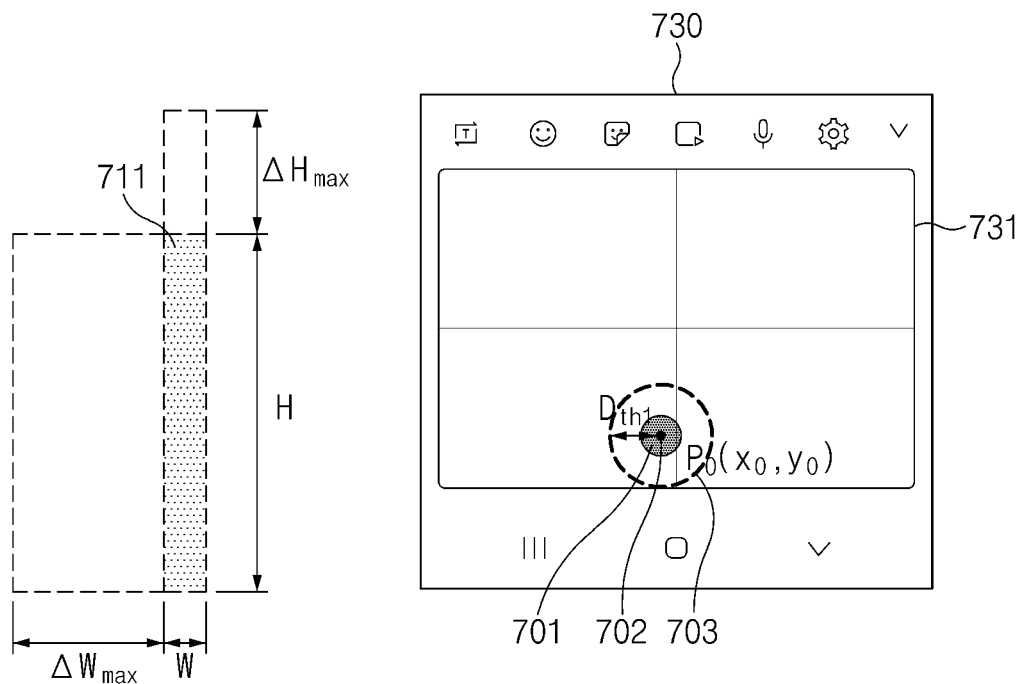
FIGS. 7 and 8 are diagrams illustrating an example method of determining a size of a cursor in a size change mode of an electronic device according to an embodiment.
Figure 8:
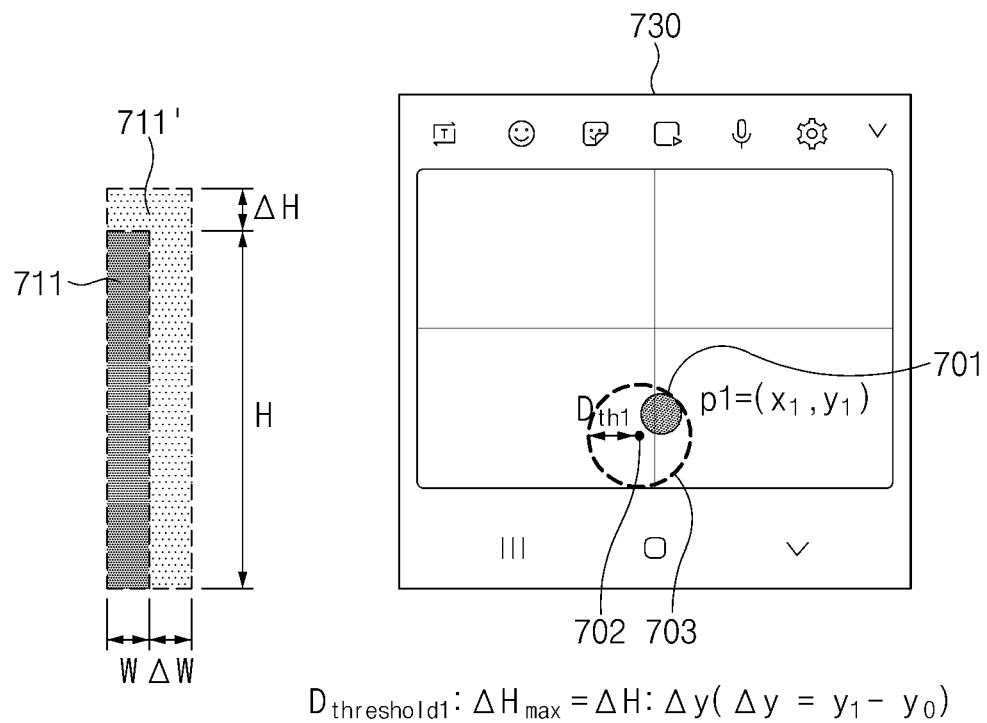

FIGS. 7 and 8 are diagrams illustrating an example method of determining a size of a cursor in a size change mode of an electronic device according to an embodiment.

Referring to FIG. 7, a cursor 711 may have a first width W and a first height H in a normal mode before entering a size change mode. A maximum change height ($\Delta$Hmax) may refer, for example, to a maximum value to which the height H of the cursor 711 is able to increase in the size change mode. A maximum change width ($\Delta$Wmax) may refer, for example, to a maximum value at which the width W of the cursor 711 is able to increase in the size change mode.

The processor may display the current user's touch 701 on a touch input area 731 in a touch pad UI 730. The coordinates of a first position p0 of the user's touch 701 is (x0, y0).

The processor may display reference coordinates 702 and a distance threshold area 703 centered on the reference coordinates 702 on the touch input area 731. The distance threshold area 703 may, for example, be a circular area having a first distance threshold value (Dthreshold1) as a radius around the reference coordinates 702. The reference coordinates 702 may indicate the user's touch position at a time point at which the touch pad UI 730 starts to be activated or a position at which the user starts touching after the touch pad UI 730 is displayed.

Referring to FIG. 8, the user's touch 701 may move to a second position p1. The coordinates of the second position p1 may be expressed as (x1, y1). In this example, the processor may identify that the user's touch 701 moves to the second position p1 within the distance threshold area 703 at a speed less than the speed threshold value (Vthreshold), and the processor may enter the size change mode of the cursor 711.

The cursor 711' in the size change mode may have a second width (W+$\Delta$W) and a second height (H+$\Delta$H). For example, the width of the cursor 711' in the size change mode may be changed from the first width W of the cursor 711 in a normal mode to the second width (W+$\Delta$W), and the height of the cursor 711 in the normal mode may be changed from the first height H to the second height (H+$\Delta$H). In this case, the processor may, for example, and without limitation, determine a change height ($\Delta$H) based on the following equations (1) and (2).

$$D\text{threshold1}:\Delta H\text{max}=\Delta H:\Delta y \qquad \text{Equation (1)}$$

$$\Delta y=y1-y0 \qquad \text{Equation (2)}$$

For example, the processor may determine the change height ($\Delta$H) using a proportional relationship in which the first distance threshold value (Dthreshold1) versus the maximum change height ($\Delta$Hmax) is equal to the change height ($\Delta$H) versus the vertical movement distance ($\Delta y$=y1−y0) of the user's touch 701.

The processor may, for example, and without limitation, determine the change width ($\Delta$W) of the cursor 711' in the size change mode based on the following equations (3) and (4).

$$D\text{threshold1}:\Delta W\text{max}=\Delta W:\Delta x \qquad \text{Equation (3)}$$

$$\Delta x=x1-x0 \qquad \text{Equation (4)}$$

For example, the processor may determine the change width ($\Delta$W) based on the proportional relationship in which the distance threshold value (Dthreshold1) versus the maximum change width ($\Delta$Wmax) is equal to the change width ($\Delta$W) versus horizontal movement distance ($\Delta x$=x1−x0) of the user's touch 701.

The processor may change the size of the cursor 711' in the size change mode in the direction identical to or corresponding to the movement direction of the user's touch 701 in the distance threshold area 703 and may change the size of the cursor 711' at a ratio corresponding to the moving distance of the user's touch 701 within the distance threshold area 703.

Although a description had been provided by taking, as an example, the case where the distance threshold area 703 has a circular shape having a first distance threshold value (Dthreshold1) that is constant as a radius in FIGS. 7 and 8, the distance threshold area 703 may have an elliptical shape having a varied radius according to an embodiment.

Hereinafter, a movement operation of a cursor of an electronic device according to an embodiment will be described in greater detail with reference to FIGS. 3, 9, and 10.

Figure 9:
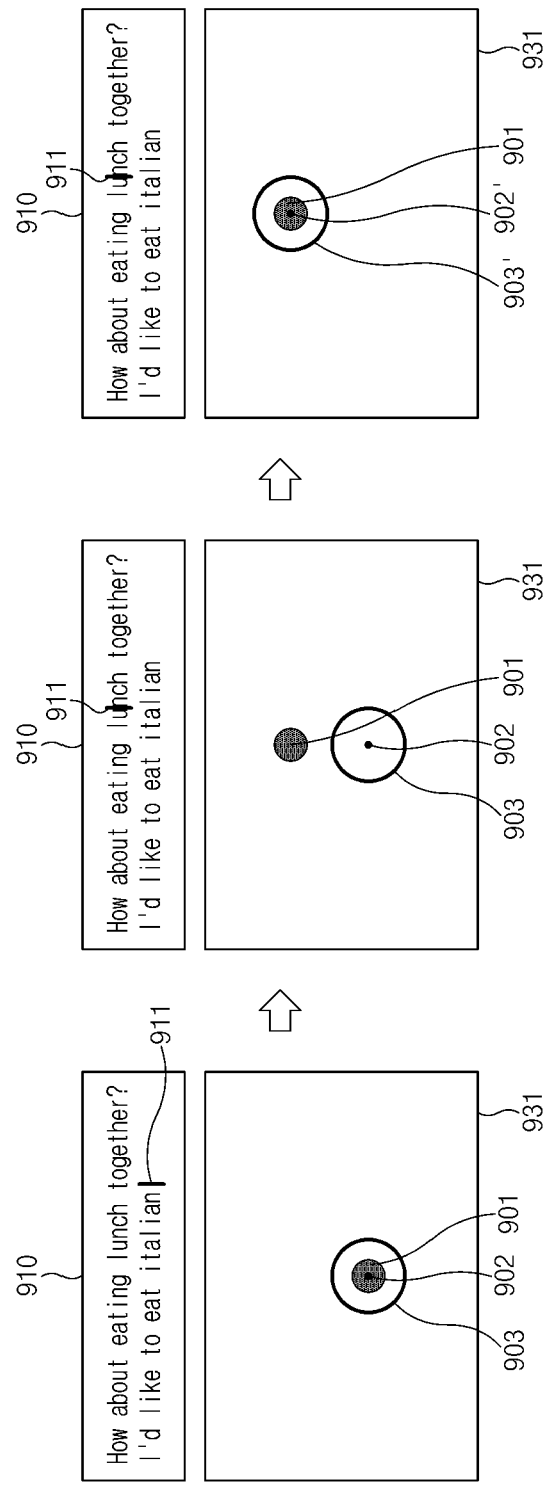
FIG. 9 is a diagram illustrating an example movement operation of a cursor of an electronic device according to an embodiment.

FIG. 9 is a diagram illustrating an example movement operation of a cursor of an electronic device according to an embodiment. FIG. 10 is a diagram illustrating an example movement operation of a cursor of an electronic device according to an embodiment.

Referring to FIGS. 3 and 9, the processor may determine whether a movement speed (Vmove) of a user's touch 901 on a touch input area 931 is less than a speed threshold value (Vthreshold) (304). The processor may display the touch input area 931 on the display, and display reference coordinates 902 and a distance threshold area 903 centered on the reference coordinates 902 on the touch input area 931.

When a movement speed (Vmove) of the user's touch 901 is less than a speed threshold value (Vthreshold), the processor may determine whether the movement distance (Dmove) of the user's touch 901 is greater than or equal to a first distance threshold value (Dthreshold1) (305). For example, the processor may determine whether the user's touch 901 escapes from the distance threshold area 903.

When the movement distance (Dmove) of the user's touch 901 is greater than or equal to the first distance threshold value (Dthreshold1), the processor moves a cursor 911 on content 910 in the direction identical to or corresponding to the movement direction of the user's touch 901 by one space (307). One space may correspond, for example, to an interval of one character on the content 910.

Referring to FIG. 9, when the user's touch 901 moves upwards with respect to the reference coordinates 902 outside the distance threshold area 903 at a speed less than the speed threshold value (Vthreshold), the processor may move the cursor 911 on the content 910 upwards by one space.

When the user's touch 901 moves out of the distance threshold area 903, the processor may display new reference coordinates 902' and a new distance threshold area 903' based on the position of the moved user's touch 901.

Figure 10:
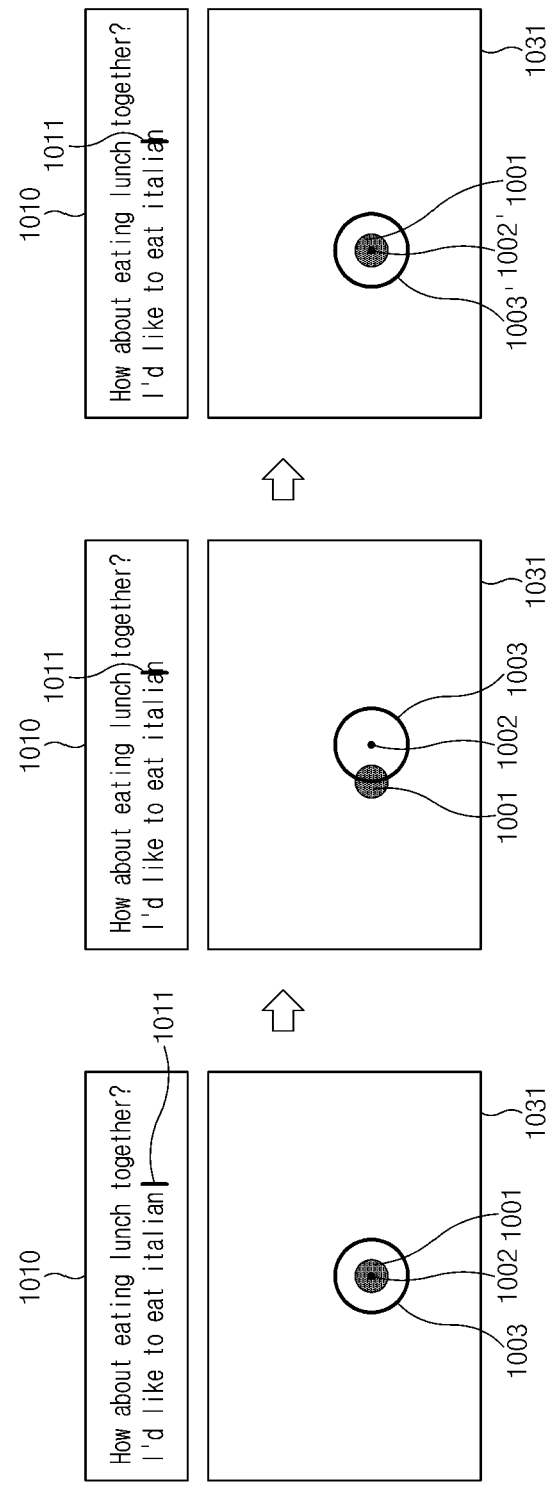
FIG. 10 is a diagram illustrating an example movement operation of a cursor of an electronic device according to an embodiment.

Referring to FIG. 10, when a user's touch 1001 moves to the left side with respect to reference coordinates 1002 within a distance threshold area 1003 on a touch input area 1031 at a speed less than a speed threshold value (Vthreshold), the processor may move a cursor 1011 on content 1010 to the left side by one space.

When the user's touch 1001 moves out of the distance threshold area 1003, the processor may display new reference coordinates 1002' and a new distance threshold area 1003' based on the position of the moved user's touch 1001.

Hereinafter, a movement operation of a cursor of an electronic device according to an embodiment will be described in greater detail with reference to FIGS. 3 and 11.

Figure 11:
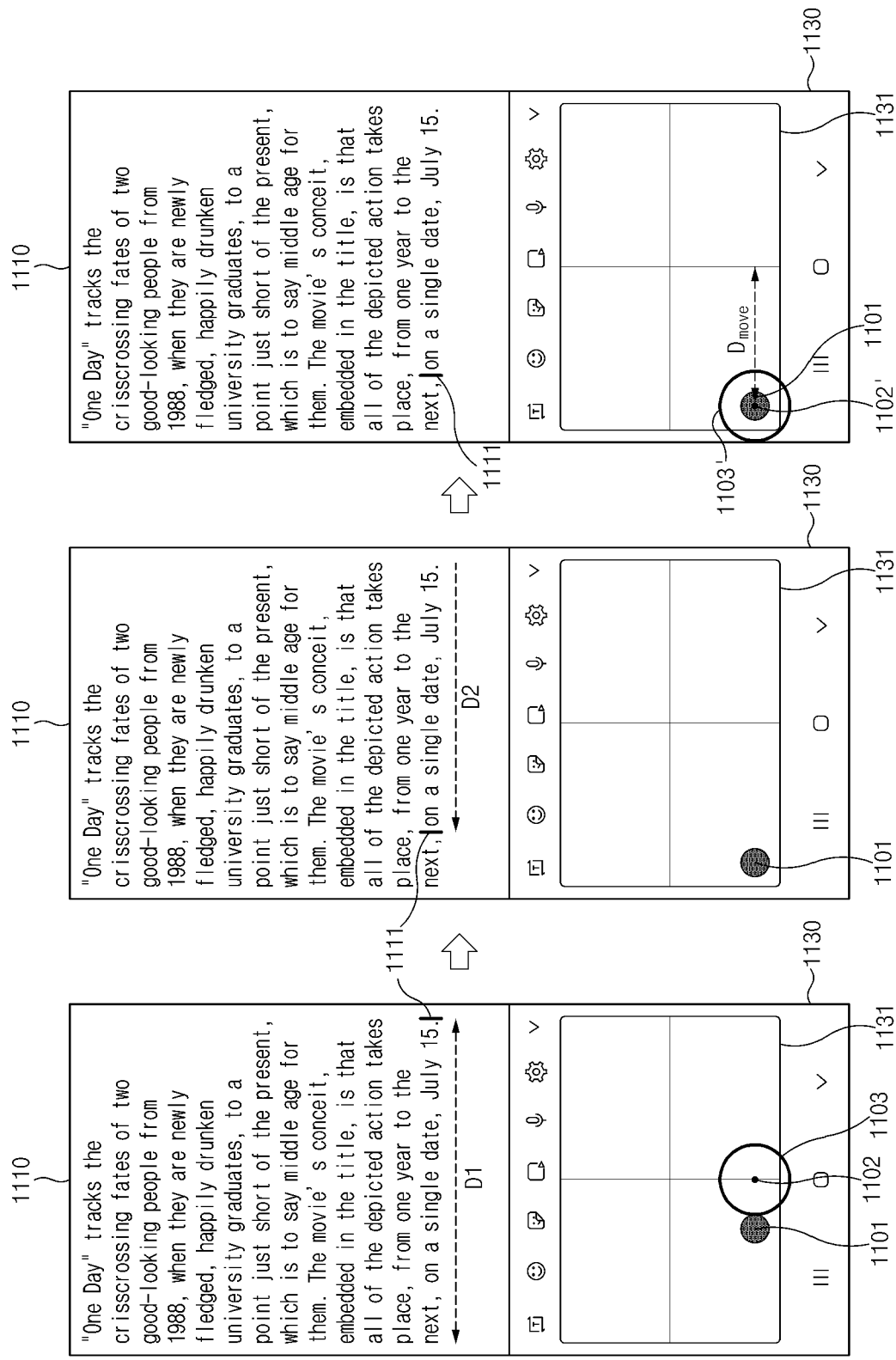
FIG. 11 is a diagram illustrating an example movement operation of a cursor of an electronic device according to an embodiment.

FIG. 11 is a diagram illustrating an example movement operation of a cursor of an electronic device according to an embodiment.

Referring to FIGS. 3 and 11, the processor may determine whether a movement speed (Vmove) of a user's touch 1101 on a touch pad UI 1130 is less than a speed threshold value (Vthreshold) (304). The processor may display reference coordinates 1102 on the touch pad UI 1130 and a distance threshold area 1103 centered on the reference coordinates 1102.

When a movement speed (Vmove) of the user's touch 1101 is greater than a speed threshold value (Vthreshold), the electronic device may determine whether the movement distance (Dmove) of the user's touch 1101 is greater than or equal to a second distance threshold value (Dthreshold2) (308). The second distance threshold value (Dthreshold2) may be expressed, for example, as in Equation (5) below.

$$D\text{threshold2} = D\text{threshold1} \times (V\text{threshold}/V\text{move}) \quad \text{Equation (5)}$$

For example, the second distance threshold value (Dthreshold2) may be equal to a value obtained by multiplying a value obtained by dividing the speed threshold value (Vthreshold) by the movement speed (Vmove) of the user's touch 1101 and the first distance threshold value (Dthreshold1).

When it is determined that the movement distance (Dmove) of the user's touch 1101 is greater than or equal to the second distance threshold value (Dthreshold2), the processor may move a cursor 1111 in a movement direction of the user's touch 1101 (309). In this example, the processor may move the cursor 1111 in the movement direction of the user's touch 1101 by a plurality of spaces at a time.

Referring to FIG. 11, when the user's touch 1101 moves to the left side based on the reference coordinates 1102 at a speed greater than the speed threshold value (Vthreshold), the processor may also move the cursor 1111 on content 1110 to the left side by a plurality of spaces.

In this example, the processor may determine a distance (D1) by which the cursor 1111 is to move to be proportional to an actual movement distance (Dmove) of the user's touch 1101. The processor moves the distance (D1) by which the cursor 1111 is to move based on a proportional relationship indicating that a straight line from the reference coordinates 1102, which is a start location of the user's touch 1101, to an end of the touch input area 1131 in the left direction (a direction in which the user's touch 1101 moves) versus an actual movement distance (Dmove) of the user's touch 1101 is equal to a straight line (D2) from a current location of the cursor 1111 to an end of the content 1110 in the left direction (a direction in which the user's touch 1101 moves) versus a movement distance (D1) of the cursor 1111.

The actual movement distance of the cursor 1111 may not necessarily equal to the movement distance (D1) obtained through the proportional relationship, and when the movement distance (D1) is located in the middle of one character on the content 1110, the cursor may move to enter the left space or right space of a relevant character.

When the user's touch 1101 moves at a speed greater than the speed threshold value (Vthreshold), the processor may display new reference coordinates 1102' and a new distance threshold area 1103' based on the position of the moved user's touch 1101.

Referring back to FIGS. 3 and 11, when the movement distance (Dmove) of the user's touch 1101 is less than a second distance threshold area (Dthreshold2), the processor may not perform movement of the cursor 1111 for movement of a relevant user's touch 1101. When the movement distance (Dmove) of the user's touch 1101 is less than the second distance threshold area (Dthreshold2), the processor may not perform the movement of the cursor 1111 for the movement of the user's touch 1101 and determine whether the movement speed (Vmove) is less than the speed threshold value (Vthreshold) for movement of a next new user's touch 1101 (304).

Hereinafter, a text selection mode of a cursor of an electronic device according to an embodiment will be described in greater detail with reference to FIGS. 3 and 12.

Figure 12:
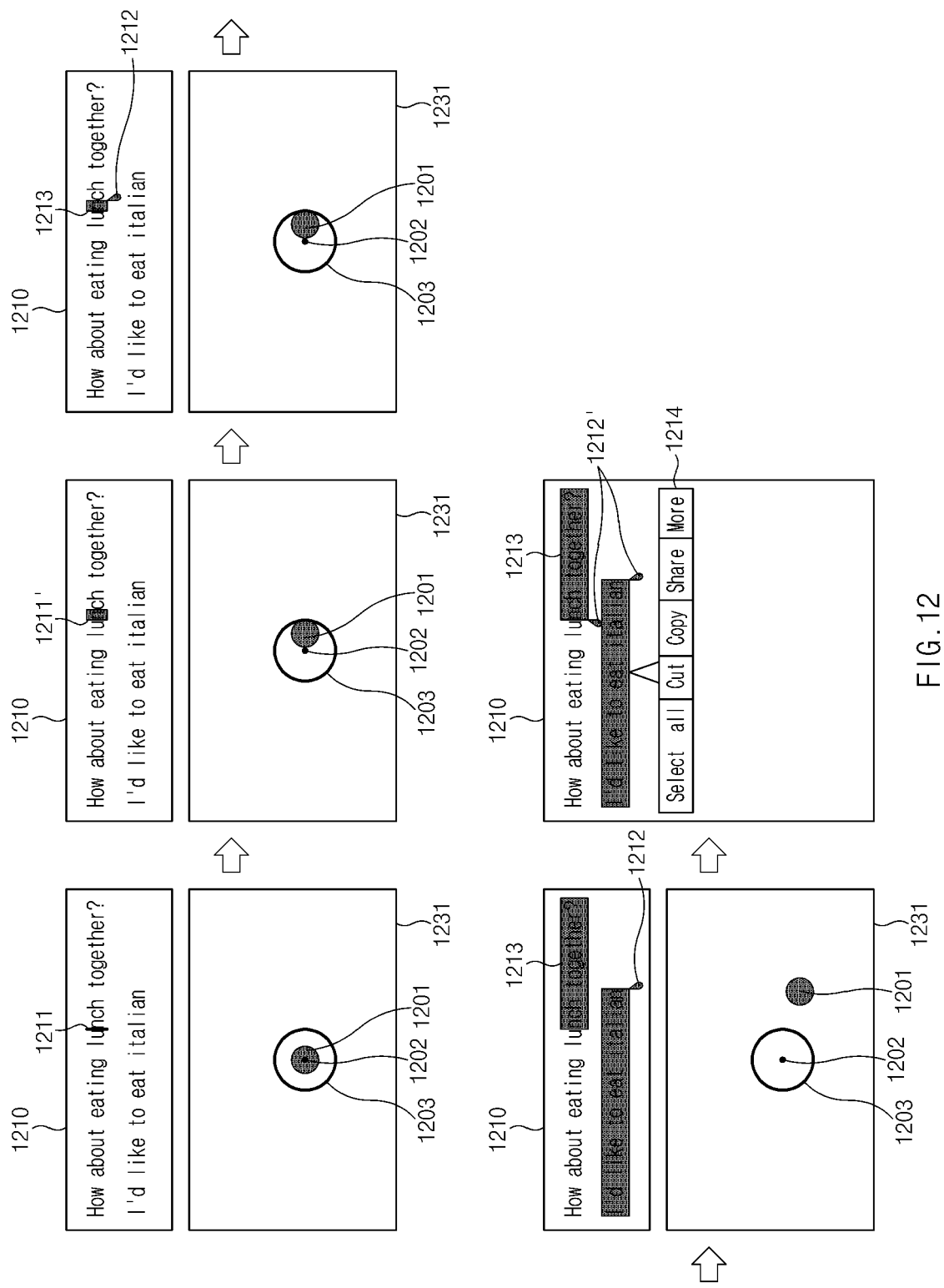
FIG. 12 is a diagram illustrating an example text selection mode of a cursor of an electronic device according to an embodiment.

FIG. 12 is a diagram illustrating an example text selection mode of a cursor of an electronic device according to an embodiment.

Referring to FIG. 3 and FIG. 12, the processor may determine whether the change width ($\Delta W$) of a cursor 1211' in the size change mode satisfies the following equation (6) and the change height ($\Delta H$) satisfies the following equation (7).

$$\Delta W/\Delta t \approx 0 \quad \text{Equation (6)}$$

$$\Delta H/\Delta t \approx 0 \quad \text{Equation (7)}$$

For example, the processor may determine whether the cursor 1211' in a size change mode is maintained in an unchanged state with a change width ($\Delta W$) and a change height ($\Delta H$) for a predetermined time ($\Delta t$) (310). For example, the processor may determine whether the user's touch is maintained at one position for the predetermined time ($\Delta t$) in the size change mode (310).

Referring to FIG. 12, the processor may display a current user's touch 1201 on a touch input area 1231, and display reference coordinates 1202 and a distance threshold area 1203 centered on the reference coordinates 1202. The processor may display a cursor 1211 on content 1210.

When the user's touch 1201 moves within the distance threshold area 1203 at a speed less than the speed threshold value (Vthreshold), the processor may enter a size change mode of the cursor 1211. The processor may change the size of the cursor 1211' in the size change mode by the change width ($\Delta W$) and the change height ($\Delta H$) based on the direction and movement distance of the user's touch 1201.

When it is determined that the cursor 1211' in the size change mode is changed by the magnitudes of the change width ($\Delta W$) and the change height ($\Delta H$), and is maintained with very little changes in the magnitudes for a predetermined time ($\Delta t$), a bubble user interface (UI) 1212 may be displayed on one side of a cursor 1213 in a text selection mode while the text selection mode is entered based on the direction and the movement distance of the user's touch 1201.

Referring back to FIGS. 3 and 12, when the cursor 1211' in the size change mode is maintained with very little changes in the magnitudes for the predetermined time ($\Delta t$), the processor may enter the text selection mode while displaying the bubble UI 1212 (312). The orders of the display of the bubble UI (311) and the entry (312) to the text selection mode may be reversed or may be performed simultaneously.

In a case in which the processor determines the movement operation of the cursor 1213 in the text selection mode, when the movement speed (Vmove) of the user's touch 1201 is less than the speed threshold value (Vthreshold) (304) and the movement distance (Dmove) is greater than or equal to the first distance threshold value (Dthreshold1) (305), the processor may move the cursor 1213 by one space in a direction identical to or corresponding to the movement direction of the user's touch 1201 (307), and when the movement speed (Vmove) of the user's touch 1201 is larger than the speed threshold value (Vthreshold) (304) and the movement distance (Dmove) is larger than or equal to the second distance threshold value (Dthreshold2) (308), the processor may move the cursor 1213 by a plurality of spaces in a direction identical to or corresponding to the movement direction of the user's touch 1201 (309). The user's touch for moving the cursor 1213 in the text selection mode may be continuous with the user's touch for entering the text selection mode or a new touch after release when the user's touch for entering the text selection mode had been made.

Referring back to FIG. 12, the processor may perform control to display a selection area for selecting at least a part of the contents of the content 1210 while the cursor 1213 in the text selection mode is moving. When it is determined that the movement of the cursor 1213 in the text selection mode is completed, the processor may change a color of the cursor 1213 while individually displaying the bubble UI 1212' at both ends of the cursor 1213 in the text selection mode in which multiple characters are selected to inform the user that the selection of the text is completed. The processor may determine that the movement of the cursor 1213 in the text selection mode is completed as the user's touch is released.

In addition, when the text selection is completed, the processor may display a pop-up menu 1214 displaying a link operation menu. The pop-up menu 1214 may include at least one of menus such as select all, cut, copy, share, and more, The processor may identify the end of the use of a touch pad UI, such as an input for selecting an icon or menu for entering a keyboard UI mode, a release of a touch input, or a lapse of a certain time after the release of the touch input, thus again finishing display of the touch pad UI and again displaying the keyboard UI.

Hereinafter, a touch pad UI mode of an electronic device according to an embodiment will be described in greater detail with reference to FIG. 13. A description for the same configuration as the embodiment described above may not be repeated.

Figure 13:
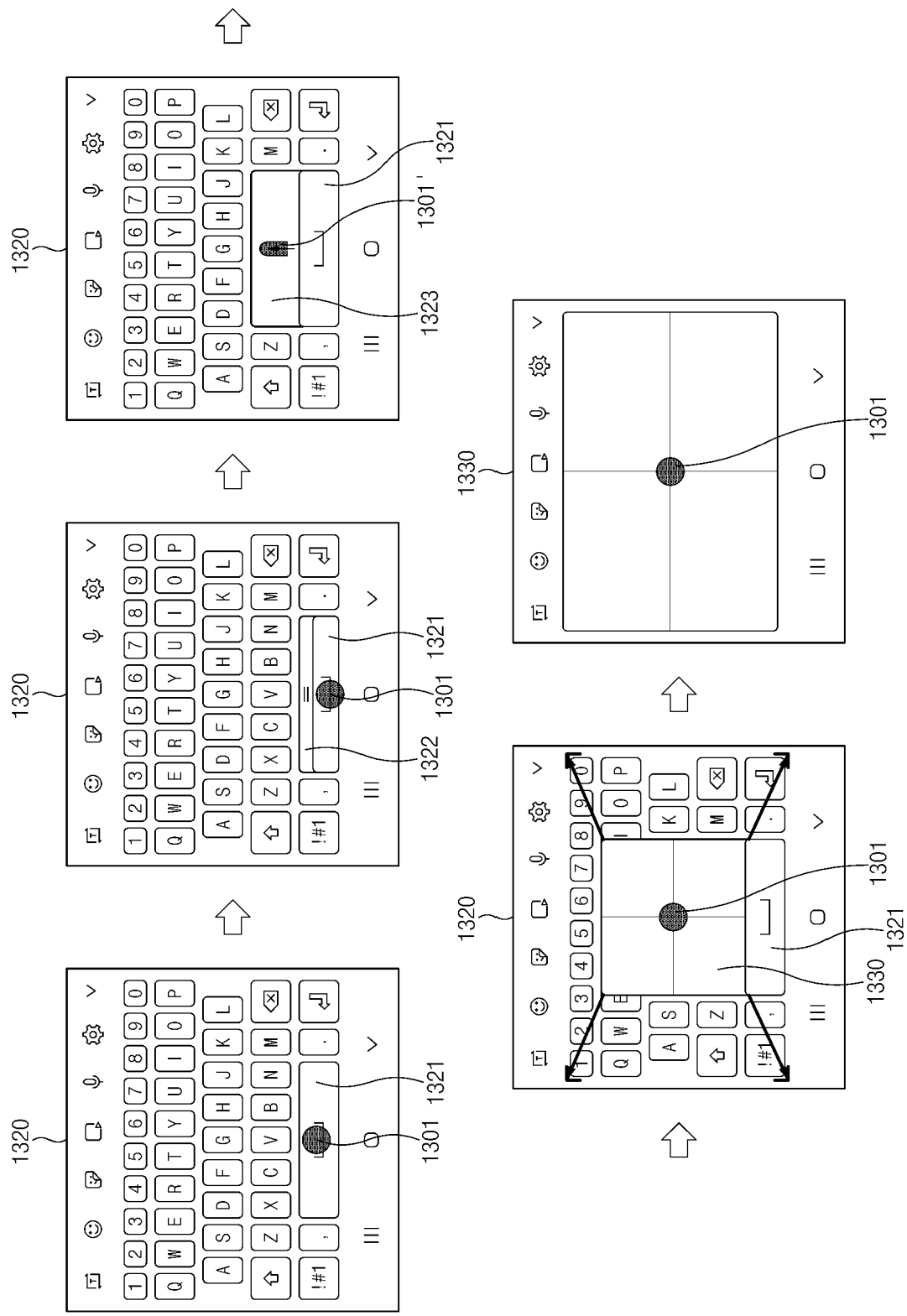
FIG. 13 is a diagram illustrating an example method for entering a touch pad UI mode of an electronic device according to an embodiment.

FIG. 13 is a diagram illustrating an example method for entering a touch pad UI mode of an electronic device according to an embodiment.

Referring to FIG. 13, an electronic device according to an embodiment may display a keyboard UI 1320. The keyboard UI 1320 may include a space key 1321. The processor may determine whether there is a long press input on the space key 1321. The processor may display a current user's touch 1301 on the keyboard UI 1320.

The processor may display a UI 1322 for entering the touch pad UI mode on the upper side of the space key 1321 when there is a long press input on the space key 1321. The processor may determine whether there is a slide input 1301' in the UI 1322 for entering the touch pad UI mode. The slide input 1301' may be continuous with the long press input on the space key 1321. When there is the slide input 1301', the processor may enter a touch pad UI 1330 mode while displaying the touch pad UI 1330 to be unfolded.

Hereinafter, a touch pad UI mode of an electronic device according to an embodiment will be described in greater detail with reference to FIG. 14. A description for the same configuration as the embodiment described above may not be repeated.

Figure 14:
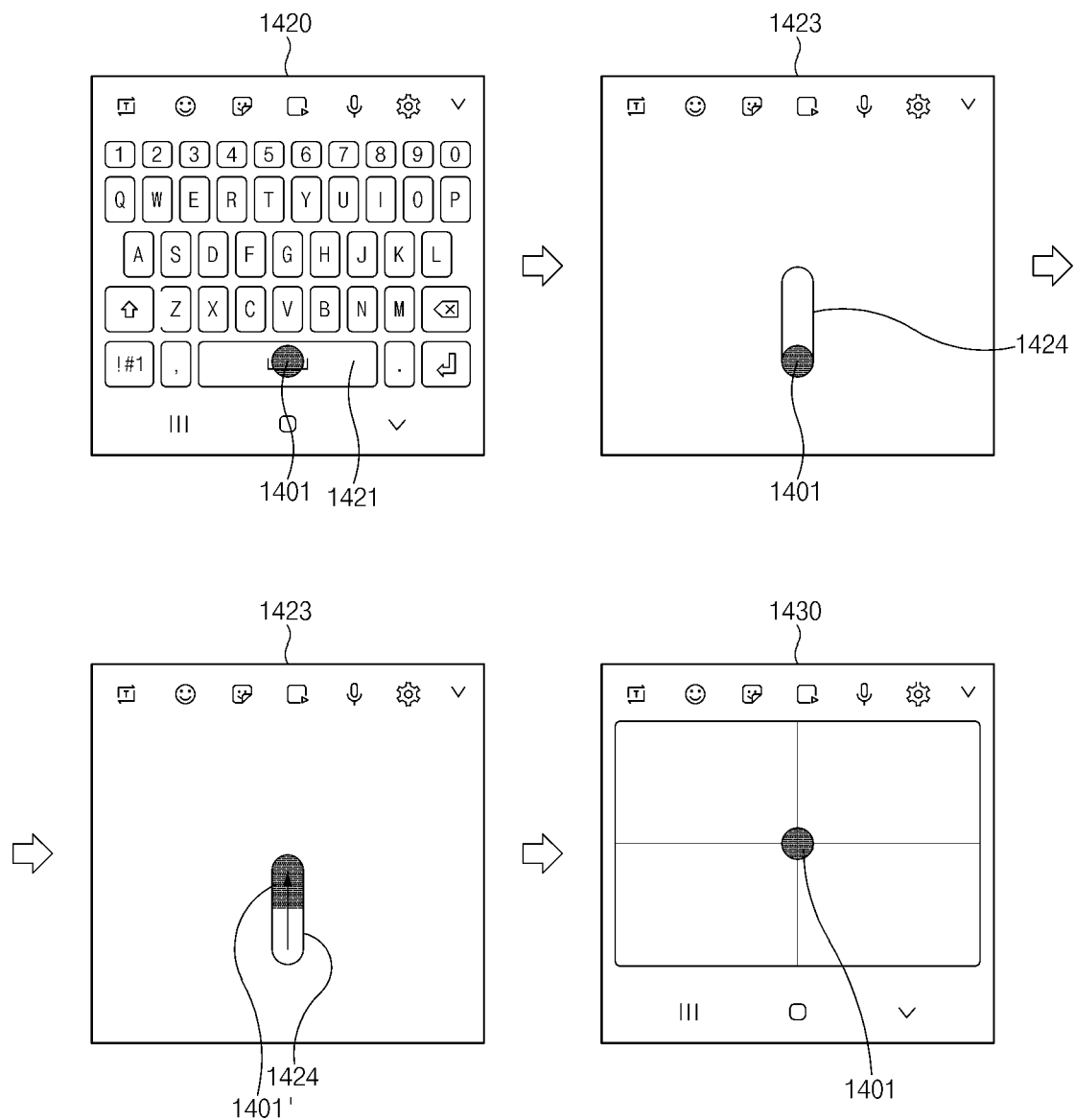
FIG. 14 is a diagram illustrating an example method for entering a touch pad UI mode of an electronic device according to an embodiment.

FIG. 14 is a diagram illustrating an example method for entering a touch pad UI mode of an electronic device according to an embodiment.

Referring to FIG. 14, an electronic device according to an embodiment may display a keyboard UI 1420. The keyboard UI 1420 may include a space key 1421. The electronic device may determine whether there is a long press input on the space key 1421. The processor may display a location 1401 of the current user's touch on the keyboard UI 1420.

The processor may display an UI 1423 for entering the touch pad UI mode when there is a long press input on the space key 1421. The UI 1423 for entering the touch pad UI mode may include a slide guide 1424. The slide guide 1424 may inform a user of a location of a slide input.

The processor may enter the touch pad UI mode by displaying the touch pad UI 1430 when there is the user's slide input 1401' in the slide guide 1424 of the UI 1423 for entering the touch pad UI mode.

Hereinafter, a text selection mode of a cursor of an electronic device according to an embodiment will be described in greater detail with reference to FIG. 15. A description for the same configuration as in the above-described embodiment will be omitted.

Figure 15:
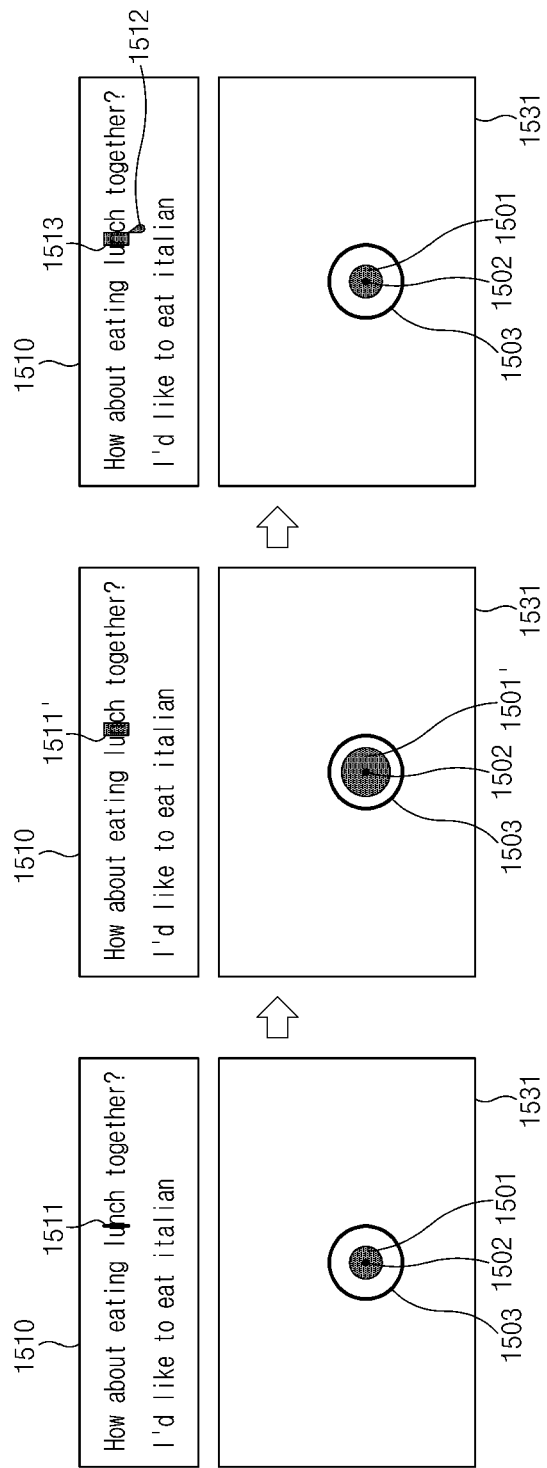
FIG. 15 is a diagram illustrating an example text selection mode of a cursor of an electronic device according to an embodiment.

FIG. 15 is a diagram illustrating an example text selection mode of a cursor of an electronic device according to an embodiment.

Referring to FIG. 15, the electronic device may display a current user's touch 1501 on a touch input area 1531, and display reference coordinates 1502 and a distance threshold area 1503 centered on the reference coordinates 1502. The electronic device may display a cursor 1511 on content 1510.

The processor may enter the cursor 1513 in the text selection mode while displaying a bubble UI 1512 on one side of a cursor 1511' of which the size increases according to an area of a user's touch when an area of the user's touch 1501 is increased by a threshold value 1501' or more, such as when the user performs touch with a greater pressure.

Hereinafter, a text selection mode of a cursor of an electronic device according to an embodiment will be described in greater detail with reference to FIG. 16. A description for the same configuration as in the above-described embodiment will be omitted.

Figure 16:
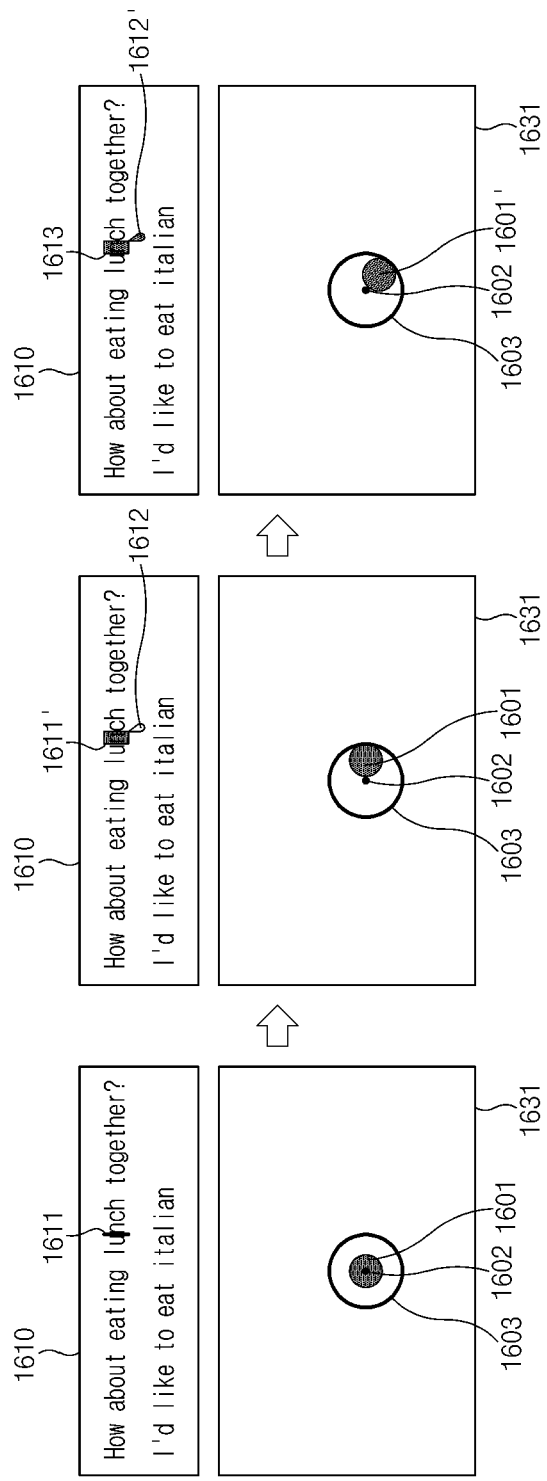
FIG. 16 is a diagram illustrating an example text selection mode of a cursor of an electronic device according to an embodiment.

FIG. 16 is a diagram illustrating an example text selection mode of a cursor of an electronic device according to an embodiment.

Referring to FIG. 16, the electronic device may display a current user's touch 1601 on a touch input area 1631, and display reference coordinates 1602 and a distance threshold area 1603 centered on the reference coordinates 1602. The electronic device may display a cursor 1611 on content 1610.

When the user's touch 1601 moves within the distance threshold area 1603 at a speed less than a speed threshold value (Vthreshold), the processor may change a size of a cursor 1611' in the size change mode based on the direction and movement distance of the user's touch 1601.

When the user's touch 1601 is maintained for a predetermined time at one location, the processor may display a temporary bubble UI 1612, which is a UI for selecting an entry into a text selection mode on one side of the cursor 1611' in the size change mode.

When there is an input 1601' of the user selecting the temporary bubble UI 1612, for example, when there is the input 1601' of the user selecting entry to the text selection mode, the processor may enter the text selection mode and display a bubble UI 1612' on one side of a cursor 1613 in the text selection mode.

In this example, the user's input 1601' selecting the temporary bubble UI 1612 may, for example, be an operation of dragging the user's touch 1601 in the direction identical to or corresponding to a direction in which the temporary bubble UI 1612 is located. When the temporary bubble UI 1612 is located at the lower side of the cursor 1611' in the size change mode, the user's input 1601' for selecting the temporary bubble UI 1612 may be an operation of dragging the user's touch 1601 toward the lower side of the reference coordinates 1602. The movement of the user's touch 1601 within the distance threshold area 1603 and the user's input 1601' for selecting the temporary bubble UI 1612 may be a continuous touch in which the touch is not interrupted in the middle.

According to various example embodiments disclosed herein, it is possible to provide an electronic device which eliminates and/or reduces visual interference in which a finger or an input device such as a touch pen hides and/or obscures a display and provides an improved method of operating a cursor with improved accuracy, thus providing various user experiences.

In addition, various effects may be provided that are directly or indirectly understood through the disclosure.

While the disclosure has been illustrated and described with reference to various example embodiments thereof, it will be understood that the various example embodiments are intended to be illustrative, not limiting, and those skilled in the art will understand that various changes in form and details may be made therein without departing from the true spirit and full scope of the disclosure, including the appended claims and their equivalents.

What is claimed is:

1. An electronic device comprising:
   a display device including a touch sensor; and
   a processor electrically connected to the touch sensor and the display device,
   wherein the processor is configured to control the electronic device to:
      display content and a cursor on a first area of the display device,
      display a touch pad user interface configured to receive a touch input on a second area of the display device, and
      control the cursor on the first area based on the touch input received through the touch pad user interface displayed on the second area, wherein the processor being configured to control the cursor includes the processor being configured to:
      control for determining whether to move the cursor or change a size of the cursor based on whether a condition A or a condition B is satisfied, wherein the condition A comprises that a movement speed of the touch input is greater than a speed threshold value and a movement distance of the touch input is greater than or equal to a second distance threshold value or that the movement speed of the touch input is less than the speed threshold value and the movement distance of the touch input is greater than a first distance threshold value,
      wherein the condition B comprises that the movement speed of the touch input is less than the speed threshold value and the movement distance of the touch input is less than the first distance threshold value, and
      in response to the processor determining that the condition B is satisfied, control for changing a width of the cursor in proportion to a horizontal movement distance of the movement distance of the touch input, wherein the width of the cursor is to be changed by a value to be obtained by dividing a value obtained by multiplying a first distance threshold area and the horizontal movement distance of the touch input by a maximum change width, and wherein the maximum change width corresponds to a maximum value to which the width of the cursor is able to increase.

2. The electronic device of claim 1, wherein the first area and the second area are displayed to not overlap each other.

3. The electronic device of claim 1, wherein the processor is configured to control the electronic device to:
control the cursor to move one space in the direction corresponding to the movement direction of the touch input based on identifying that the movement speed of the touch input is less than the speed threshold value and the movement distance of the touch input is greater than or equal to the first distance threshold value.

4. The electronic device of claim 1, wherein the processor is configured to control the electronic device to: control the cursor to move a plurality of spaces in a direction corresponding to the movement direction of the touch input based on identifying that the movement speed of the touch input is greater than or equal to the speed threshold value and the movement distance of the touch input is greater than or equal to the second distance threshold value.

5. The electronic device of claim 4, wherein the second distance threshold value is obtained by multiplying the first distance threshold value by a value obtained by dividing the speed threshold value by the movement speed of the touch input.

6. The electronic device of claim 4, wherein the movement distance of the cursor is proportional to the movement distance of the touch input.

7. The electronic device of claim 1, wherein the processor is configured to control the electronic device to change the size of the cursor in a direction corresponding to the movement direction of the touch input.

8. The electronic device of claim 1, wherein the processor is configured to control the electronic device to: enter a text selection mode for displaying a selection area in which at least a part of the content is selected based on movement of the cursor by identifying that the size of the cursor is maintained in a changed state for a threshold time.

9. The electronic device of claim 1, wherein the processor is configured to control the electronic device to:
display a user interface configured to determine whether to enter a text selection mode by identifying that the size of the cursor is maintained in a changed state for a threshold time, and
enter the text selection mode for displaying a selection area in which at least a part of the content is selected based on movement of the cursor by identifying an input for selecting the user interface for selection of entry to the displayed text selection mode.

10. The electronic device of claim 1, wherein the processor is configured to control the electronic device to: enter a text selection mode for displaying a selection area in which at least a part of the content is selected based on movement of the cursor by identifying that a touch area of the touch input increases by a threshold value or more.

11. The electronic device of claim 1, wherein the processor is configured to control the electronic device to: display the touch pad user interface on the second area of the display device based on receiving a specific input for a specific key included in a keyboard user interface displayed on the second area of the display device.

12. The electronic device of claim 1, wherein the processor is configured to control the electronic device to:
display a user interface for entering a touch pad user interface mode based on receiving a specific input for a specific key included in a keyboard user interface displayed on the second area of the display device, and
display the touch pad user interface on the second area of the display device based on receiving a slide input for the user interface for entry to the displayed touch pad user interface mode.

13. The electronic device of claim 1, wherein the processor is configured to control the electronic device to change a color of the cursor in response to displaying the touch pad user interface.

14. The electronic device of claim 1, wherein the processor is configured to control the electronic device to: change the height of the cursor by a value obtained by dividing a value obtained by multiplying a first distance threshold area and the vertical movement distance of the touch input by a maximum change height, and wherein the maximum change height corresponds to a maximum value to which the height of the cursor is able to increase.

15. An electronic device comprising:
a display device including a touch sensor; and
a processor electrically connected to the touch sensor and the display device,
wherein the processor is configured to control the electronic device to:
display content and a cursor on a first area of the display device,
display a touch pad user interface configured to receive a touch input on a second area of the display device,
control the cursor on the first area based on the touch input received through the touch pad user interface displayed on the second area, wherein the processor being configured to control the cursor includes the processor being configured to:
control for determining whether to move the cursor or change a size of the cursor based on whether a condition A or a condition B is satisfied, wherein the condition A comprises that a movement speed of the touch input is greater than a speed threshold value and a movement distance of the touch input is greater than or equal to a second distance threshold value or that the movement speed of the touch input is less than the speed threshold value and the movement distance of the touch input is greater than a first distance threshold value,
wherein the condition B comprises that the movement speed of the touch input is less than the speed threshold value and the movement distance of the touch input is less than the first distance threshold value, and
in response to the processor determining that the condition B is satisfied, control for changing a height of the cursor in proportion to a vertical movement distance of the movement distance of the touch input, wherein the height of the cursor is to be changed by a value to be obtained by dividing a value obtained by multiplying a first distance threshold area and the vertical movement distance of the touch input by a maximum change height, and wherein the maximum change height corresponds to a maximum value to which the height of the cursor is able to increase.

16. The electronic device of claim 15, wherein the processor is configured to control the electronic device to: change the width of the cursor by a value obtained by dividing a value obtained by multiplying a first distance threshold area and the horizontal movement distance of the touch input by a maximum change width, and wherein the maximum change width corresponds to a maximum value to which the width of the cursor is able to increase.

17. An electronic device comprising:
a display device including a touch sensor; and
a processor electrically connected to the touch sensor and the display device, wherein the processor is configured to control the electronic device to:
- display content and a cursor on a first area of the display device,
- display a touch pad user interface configured to receive a touch input on a second area of the display device, and
- control the cursor on the first area based on the touch input received through the touch pad user interface displayed on the second area, wherein controlling the cursor includes:
  - moving the cursor in a direction corresponding to a movement direction of the touch input based on identifying that a movement speed of the touch input is greater than a speed threshold value and a movement distance of the touch input is greater than or equal to a first distance threshold value,
  - changing a size of the cursor based on identifying that the movement speed of the touch input is less than the speed threshold value and the movement distance of the touch input is less than a second distance threshold value,
- in response to receiving the touch input on the second area of the display device, control for displaying, in the second area of the display device, (1) a reference input object corresponding to a coordinate of the touch input and (2) a distance threshold objection representing the first distance threshold value centered with reference to the reference input object.

18. The electronic device of claim 17, wherein the processor is configured to control the electronic device to: change a width of the cursor in proportion to a horizontal movement distance of the movement distance of the touch input, and change a height of the cursor in proportion to a vertical movement distance of the movement distance of the touch input.

19. The electronic device of claim 17, wherein the processor is configured to control the electronic device to: change a height of the cursor by a value obtained by dividing a value obtained by multiplying a first distance threshold area and the vertical movement distance of the touch input by a maximum change height, and wherein the maximum change height corresponds to a maximum value to which the height of the cursor is able to increase.

20. The electronic device of claim 17, wherein the processor is configured to control the electronic device to: change a width of the cursor by a value obtained by dividing a value obtained by multiplying a first distance threshold area and the horizontal movement distance of the touch input by a maximum change width, and wherein the maximum change width corresponds to a maximum value to which the width of the cursor is able to increase.

* * * * *